N. J. COLMAN.
Water-Wheels.

No. 135,891.

Patented Feb. 18, 1873.

Witnesses
J. L. Boone
C. M. Richardson

Inventor
Nicholas J. Colman
per Dewey & Co
Attys

UNITED STATES PATENT OFFICE.

NICHOLAS J. COLMAN, OF RAILROAD FLAT, CALIFORNIA.

IMPROVEMENT IN WATER-WHEELS.

Specification forming part of Letters Patent No. 135,891, dated February 18, 1873.

*To all whom it may concern:*

Be it known that I, NICHOLAS J. COLMAN, of Railroad Flat, county of Calaveras, State of California, have invented a Water-Wheel; and I do hereby declare the following description and accompanying drawing are sufficient to enable any person skilled in the art or science to which it most nearly appertains to make and use my said invention without further invention or experiment.

My invention relates to that class of water-wheels which derive their power from a high column of water delivered upon buckets at their periphery from a pen-stock, and which are commonly known as hurdy-gurdy wheels. Its object is to more completely utilize the water and give a higher percentage of power than has been hitherto obtained; and this is effected mainly by an improved form of buckets, in which a series of central buckets having wedge or plow shaped points are combined with two series of buckets which are curved outwardly from the central ones, and also upwardly toward the periphery of the wheel where they discharge to the right and left. By this construction the bucket is carried from the point of least diameter where it receives the water to the periphery of the wheel by an increasing curve. The water thus exerts its force upon the full length of the buckets, and the power is not lost by the centrifugal force caused by the high velocity of the wheel, and which in ordinary wheels reduces the power of the water to the result of its first impact upon the buckets.

Figure 1:
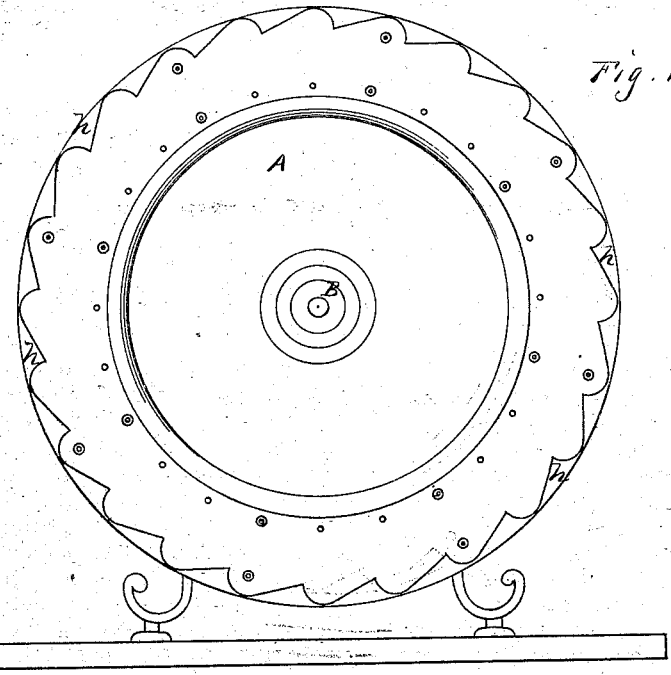
Figure 2:
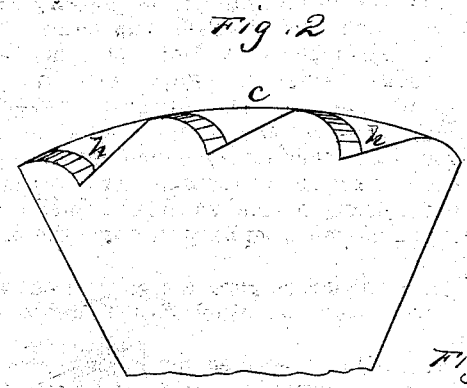
Figure 3:
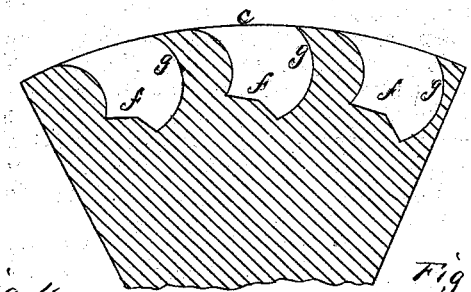
Figure 4:
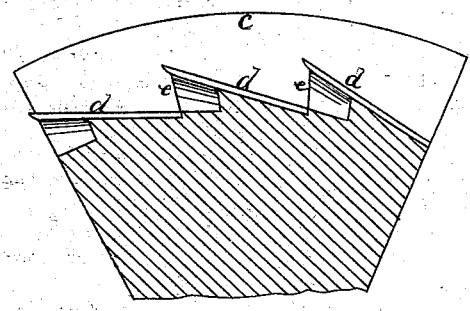
Figure 5:
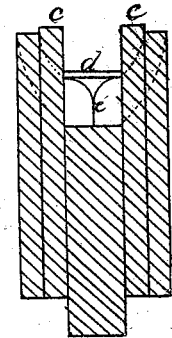

Referring to the accompanying drawing for a more complete explanation of my invention, Figure 1 is a side elevation. Fig. 2 is an enlarged section. Fig. 3 is a view of the discharge-passages. Fig. 4 is a side view of a section of the bucket. Fig. 5 is a transverse section showing one bucket.

A is a wheel suitably mounted upon a horizontal axle, B. The central line of buckets is situated between the sides C C, Fig. 5, and on a curve somewhat smaller than that of these sides. These buckets are double-winged or plow-shaped, having a back, $d$, the full width of the opening, and being tapered off to an edge at $e$. From each side of this wedge the water passes through openings $f$ in the side pieces or rims C. These openings are curved outwardly from the central point $e$, and also sweep upward from the center of the wheel toward the periphery, as shown at $g$, finally discharging at the periphery to the right and left.

The action of the water is as follows: Leaving the pen-stock it strikes the wedge $e$ and back $d$, exerting its first force upon this back. The wedge divides the water, which then follows the upward and outwardly-sweeping curve $g$, still exerting its force upon the full length of the buckets while combining its momentum with the centrifugal force acquired by the velocity of the wheel, and finally discharging at the periphery through the openings $h$.

This construction gives a higher percentage of power than any other form hitherto employed.

Having thus described my invention, what I claim and desire to secure by Letters Patent, is—

1. The wedge or plow shaped buckets, dividing the water at $e$, and curving toward the sides at $f$, substantially as and for the purpose described.

2. In combination with the wedge-shaped buckets, as shown, the upwardly-curving buckets $g$ discharging at the periphery, substantially as and for the purpose herein described.

In witness whereof I hereunto set my hand and seal.

NICHOLAS J. COLMAN. [L. S.]

Witnesses:
    HENRY HAYE,
    HENRY SEEMANN.